US009567963B2

(12) United States Patent
Morino et al.

(10) Patent No.: US 9,567,963 B2
(45) Date of Patent: Feb. 14, 2017

(54) VEHICLE CONTROL DEVICE

(75) Inventors: Takuro Morino, Numadu (JP); Shuji Moriyama, Susono (JP); Yoshio Ito, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 166 days.

(21) Appl. No.: 14/390,900

(22) PCT Filed: Apr. 9, 2012

(86) PCT No.: PCT/JP2012/059718
§ 371 (c)(1),
(2), (4) Date: Oct. 6, 2014

(87) PCT Pub. No.: WO2013/153608
PCT Pub. Date: Oct. 17, 2013

(65) Prior Publication Data
US 2015/0075474 A1   Mar. 19, 2015

(51) Int. Cl.
*F02F 1/10* (2006.01)
*F02N 9/04* (2006.01)
*F16H 61/00* (2006.01)
*F02F 1/14* (2006.01)
*F01P 3/02* (2006.01)
*F02F 1/16* (2006.01)

(52) U.S. Cl.
CPC .............. *F02N 9/04* (2013.01); *F16H 61/00* (2013.01); *F16H 61/0021* (2013.01); *F01P 3/02* (2013.01); *F01P 2003/021* (2013.01); *F02F 1/10* (2013.01); *F02F 1/14* (2013.01); *F02F 1/16* (2013.01); *F02N 2300/10* (2013.01); *F16H 2061/0034* (2013.01); *F16H 2312/14* (2013.01)

(58) Field of Classification Search
CPC ...... F02N 11/08; F02N 1/0848; F02N 11/087; F02N 11/10; B60W 10/08
USPC ....................................................... 123/179.3
See application file for complete search history.

(56) References Cited

U.S. PATENT DOCUMENTS

2010/0167872 A1   7/2010   Shirasaka et al.
2010/0311538 A1   12/2010  Miyabe et al.
(Continued)

FOREIGN PATENT DOCUMENTS

JP   2010-281432 A   12/2010
WO   2010/073765 A1   7/2010
WO   2013/076825 A1   5/2013

*Primary Examiner* — Hung Q Nguyen
*Assistant Examiner* — Charles Brauch
(74) *Attorney, Agent, or Firm* — Andrews Kurth Kenyon LLP

(57) ABSTRACT

A vehicle control device includes an engine, a starter for starting the engine, a transmission for transmitting power of the engine to a driving wheel, an oil pump for supplying hydraulic pressure to the transmission according to the power of the engine, an accumulator for accumulating the hydraulic pressure ejected from the oil pump, and an electromagnetic on-off valve for controlling the hydraulic pressure accumulated in the accumulator. When the engine is restarted after the engine has stopped, an ECU of the vehicle control device opens the electromagnetic on-off valve at the time a line pressure has become equal to or higher than a predetermined hydraulic pressure after the start of the starter, and supplies the hydraulic pressure accumulated in the accumulator to respective portions of the transmission.

1 Claim, 3 Drawing Sheets

(56) References Cited

U.S. PATENT DOCUMENTS

2011/0039657 A1* 2/2011 Gibson .............. F16H 61/0031
477/115

2014/0296032 A1 10/2014 Morino et al.

* cited by examiner

VEHICLE CONTROL DEVICE

CROSS-REFERENCE TO RELATED APPLICATIONS

This is a national phase application based on the PCT International Patent Application No. PCT/JP2012/059718 filed Apr. 9, 2012, the entire contents of which are incorporated herein by reference.

FIELD

The present invention relates to a vehicle control device.

BACKGROUND

Conventionally, there have been known vehicles that can carry out a control for automatically stopping an engine, i.e. a so-called idling stop control, while a vehicle stops or travels to improve fuel economy. In the vehicles, when the engine is stopped while the idling stop control is carried out, since hydraulic pressure for operating drive systems such as a clutch, etc. may become insufficient, an configuration, that includes an accumulator for compensating insufficient hydraulic pressure, has been known.

For example, Patent Literature 1 discloses such a configuration that when an engine is restarted after it has been automatically stopped, an electromagnetic on-off valve is opened when the engine is cranked by a starter so that the hydraulic pressure accumulated in an accumulator is supplied. Further, Patent Literature 2 discloses a configuration for starting an engine by operating a starter after an electromagnetic control valve of an accumulator has been opened.

CITATION LIST

Patent Literatures

Patent Literature 1: Japanese Patent Application Laid-open No. 2010-281432
Patent Literature 2: International Patent Application Laid-open No. WO 2010/073765

SUMMARY

Technical Problem

Since a starter requires a large current at the time of engine start, when an electromagnetic on-off valve is controlled at the time a starter starts as described in Patent Literature 1, there is a possibility that a sufficient current cannot be supplied to the electromagnetic on-off valve. In the case, since a response of the electromagnetic on-off valve is deteriorated and a valve open operation is delayed, the supply of the hydraulic pressure accumulated in an accumulator is delayed.

In contrast, there is also contemplated a method of opening an electromagnetic on-off valve after a predetermined time has passed after the start of a starter and waiting the recovery of a voltage. In the method, however, even if the voltage has been recovered earlier than a predetermined time, the electromagnetic on-off valve cannot be operated earlier. Further, in the method of starting the starter after the electromagnetic on-off valve has been opened as described in Patent Literature 2, since the starter does not start until the electromagnetic on-off valve opens, the start of the engine is delayed, and further since the current is caused to flow to the electromagnetic on-off valve before the engine starts, energy is wastefully consumed.

An object of the present invention, which was made in view of the above-described circumstances, is to provide a vehicle control device capable of stably and promptly carrying out a hydraulic pressure supply control by an accumulator after an engine has started.

Solution to Problem

In order to achieve the above mentioned object, a vehicle control device according to the present invention includes an engine; a starter configured to start the engine; a power transmission device configured to transmit power of the engine to a driving wheel; an oil pump configured to supply hydraulic pressure to the power transmission device according to the power of the engine; an accumulator configured to accumulate the hydraulic pressure ejected from the oil pump; and an electromagnetic on-off valve configured to control the hydraulic pressure accumulated in the accumulator, wherein when the engine is restarted after the engine has stopped, the electromagnetic on-off valve is opened at the time hydraulic pressure generated according to a drive of the oil pump has become equal to or higher than a predetermined hydraulic pressure after the start of the starter, and the hydraulic pressure accumulated in the accumulator is supplied to the power transmission device.

Advantageous Effects of the Invention

In the vehicle control device according to the present invention, since the electromagnetic on-off valve is opened when the hydraulic pressure, which is generated according to the drive of the oil pump has becomes equal to or higher than the predetermined hydraulic pressure after the start of the starter, an influence of voltage drop due to the start of the starter can be avoided so that the electromagnetic on-off valve can be stably controlled. As a result, the vehicle control device according to the present invention can achieve an effect that the hydraulic pressure supply control can be stably and promptly carried out by the accumulator after the engine has started.

DESCRIPTION OF EMBODIMENTS

Figure 1:
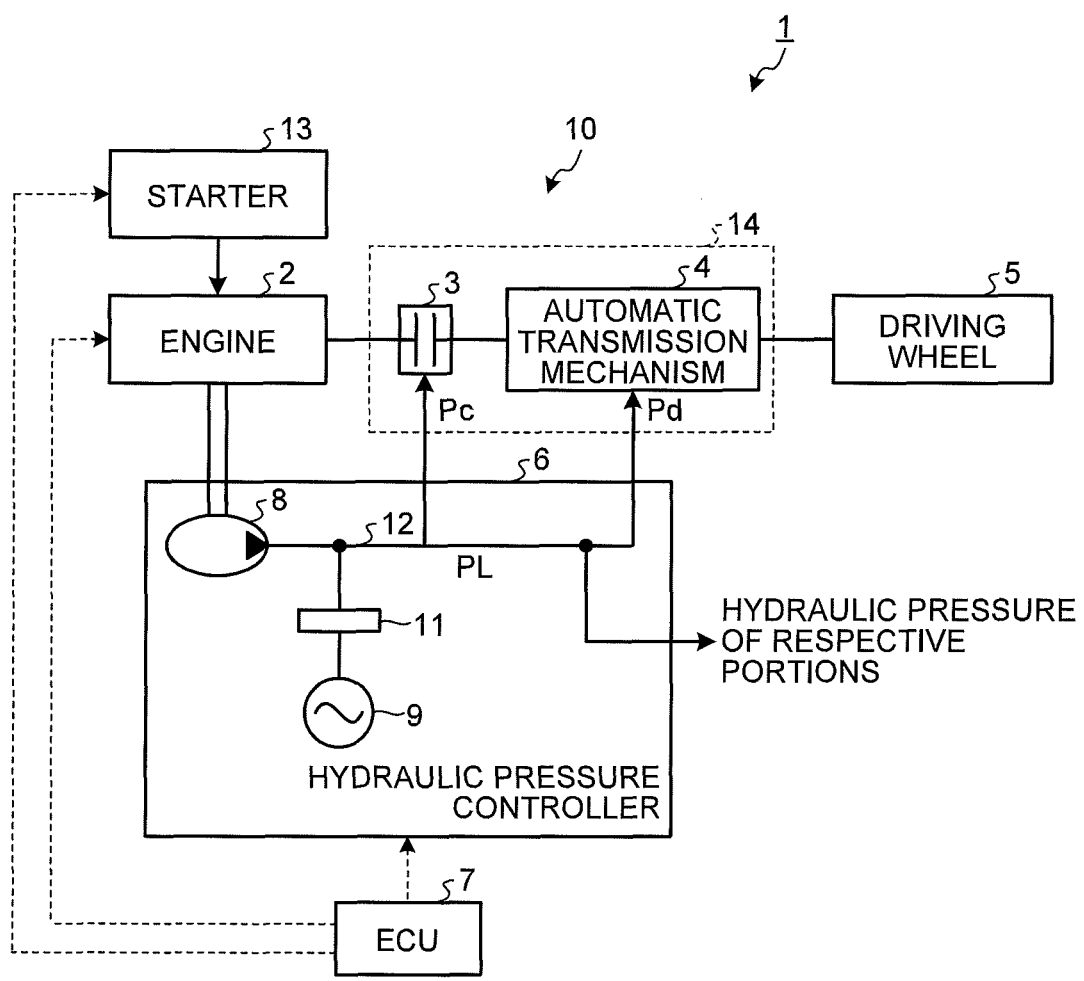
FIG. 1 is a view illustrating a schematic configuration of a vehicle control device according to an embodiment of the present invention.

An embodiment of a vehicle control device according to the present invention will be explained based on the drawings. Note that, in the following drawings, the same or corresponding portions are denoted by the same reference numerals and the explanation thereof will not be repeated.

First, referring to FIG. 1, a configuration of a vehicle control device 10 according to an embodiment of the present"

invention will be explained. FIG. 1 is a view illustrating a schematic configuration of the vehicle control device according to the embodiment of the present invention.

As shown in FIG. 1, the vehicle control device 10 is mounted on a vehicle 1. The vehicle 1 includes an engine 2, a transmission (power transmission device) 14 and a driving wheel 5. The engine 2 is an internal combustion engine as a traveling drive source of the vehicle 1, and driving force is controlled according to a fuel injection amount. The transmission 14 transmits the driving force generated by the engine 2 to the driving wheel 5 side. The driving wheel 5 is rotated by the driving force of the engine 2 transmitted via the transmission 14 and can cause the vehicle 1 to travel forward or rearward.

The transmission 14 is configured including a clutch 3 and an automatic transmission mechanism 4. The engine output torque (power) of the engine 2 is input to the automatic transmission mechanism 4 from an engine output shaft via a torque converter (not shown) and the clutch 3 and transmitted to the driving wheel 5 from the automatic transmission mechanism 4 via a decelerating mechanism, a differential gear, or the like, that are not illustrated. As described above, a power transmission path is configured between the engine 2 and the driving wheel 5.

The clutch 3 has a function for connecting and disconnecting the power transmission path between the engine 2 and the driving wheel 5. The clutch 3 has an engine side engaging element coupled with the engine 2 side and a driving wheel side engaging element coupled with the driving wheel 5 side. Engaging the engine-side engaging element with the driving wheel side engaging element allows the clutch 3 to connect the power transmission path between the engine 2 and the driving wheel 5. In contrast, releasing the engagement between the engine-side engaging element and the driving wheel side engaging element allows the clutch 3 to disconnect the power transmission path between the engine 2 and the driving wheel 5. In other words, the clutch 3 functions as a switching device for switching a power transmission possible state and a power transmission impossible state in the power transmission path between the engine 2 and the driving wheel 5.

The automatic transmission mechanism 4 is an automatic transmission for automatically changing a gear shift ratio (gear shift stage, gear stage) according to a traveling state of the vehicle 1 and can be applied to various automatic transmissions, for example, a stepped automatic transmission (AT) such as a planetary gear transmission, a parallel spur gear transmission, etc., a semiautomatic transmission such as a dual clutch transmission (DCT), etc., a multi-mode manual transmission (MMT), a sequential manual transmission (SMT), and a continuously variable transmission (CVT) such as a belt or toroidal transmission, etc.

A hydraulic pressure controller 6 has a function for supplying hydraulic pressure to the transmission 14 including the clutch 3 and the automatic transmission mechanism 4. The hydraulic pressure controller 6 can control a gear shift ratio of the automatic transmission mechanism 4 by adjusting the hydraulic pressure supplied to the automatic transmission mechanism 4 according to a gear shift ratio changing command input from an ECU 7.

Further, the hydraulic pressure controller 6 can control the release and the engagement of the clutch 3 by adjusting the hydraulic pressure supplied to the clutch 3 according to a clutch control command input from the ECU 7. The hydraulic pressure controller 6 can switch the released state and the engaged state of the clutch 3 and further can also control the degree of engagement of the clutch 3.

The hydraulic pressure controller 6 includes an oil pump 8 and an accumulator 9 as two hydraulic pressure sources. The oil pump 8 is coupled with the engine 2 and can be driven in association with the engine 2. The oil pump 8 can generate hydraulic pressure by ejecting oil using the driving force of the engine 2.

The accumulator 9 is configured such that when the oil pump 8 is driven, the accumulator 9 stores and holds (accumulates) the hydraulic pressure generated by the oil pump 8 inside thereof and can supply the thus held hydraulic pressure to respective elements of the transmission 14 when necessary without depending on an operating state of the engine 2.

The hydraulic pressure accumulation operation and the hydraulic pressure supply operation of the accumulator 9 are controlled by an electromagnetic on-off valve 11. Closing the electromagnetic on-off valve 11 (valve closing) causes the accumulator 9 to accumulate the oil inside thereof and opening the electromagnetic on-off valve 11 (valve opening) causes the accumulator 9 to eject the oil accumulated inside thereof so as to supply the hydraulic pressure. The opening/closing operation of the electromagnetic on-off valve 11 is controlled by the ECU 7. The electromagnetic on-off valve 11 is, for example, an electromagnetic poppet valve and the opening/closing thereof can be switched by adjusting a supply current by the ECU 7. The electromagnetic on-off valve 11 can be configured as a normally closed valve that is opened when, for example, a current is supplied thereto and closed at all times when no current is supplied thereto. Note that the electromagnetic on-off valve 11 may use other valve structure such as a spool valve, or the like.

The pressure accumulation operation of the accumulator 9 can be carried out when a predetermined condition is established while a vehicle travels ordinarily. The condition for carrying out the pressure accumulation operation can be established at the time the vehicle travels ordinarily except, for example, a case that the clutch 3 is being subjected to a release/engagement operation and prompt responsiveness is required to the control of the clutch 3 and a case that the amount of flow consumed in the hydraulic pressure circuit 12 (valve body) is large in a state that an engine rotating speed is low, a state that the oil temperature in the hydraulic pressure controller 6 is high, and a state that a gear change speed is fast. Note that, "while the vehicle travels ordinarily" means a state that the engine 2 is driven and the oil pump 8 is operated.

The oil pump 8 and the accumulator 9 are connected to the hydraulic pressure circuit 12. The hydraulic pressure generated by the oil pump 8 and the accumulator 9 is supplied to the clutch 3, respective portions of the transmission 14 including the automatic transmission mechanism 4, and other respective portions in the vehicle 1 via the hydraulic pressure circuit 12. The hydraulic pressure circuit 12 is provided with not shown plural pressure regulation valves, and a line pressure PL, that is the hydraulic pressure in the hydraulic pressure circuit 12, a hydraulic pressure Pc, that is the hydraulic pressure supplied to the clutch 3 after the hydraulic pressure circuit 12 has been branched to the clutch 3 side, and a hydraulic pressure Pd, that is the hydraulic pressure supplied to the automatic transmission mechanism 4 after the hydraulic pressure circuit 12 has been branched to the automatic transmission mechanism 4 side, and the like can be controlled by controlling the pressure regulation valves according to a control command from the ECU 7.

Further, a starter 13 is connected to the engine 2. The starter 13 is a drive source of a motor, etc. for starting the engine 2, the starter 13 being operated according to a control command from the ECU 7.

The vehicle 1 is provided with the ECU 7 (Electronic Control Unit) for controlling the engine 2, the clutch 3, the automatic transmission mechanism 4, the hydraulic pressure controller 6, and the starter 13, etc. The ECU 7 has a function for integrally controlling the engine 2, the clutch 3, and the automatic transmission mechanism 4 (the hydraulic pressure controller 6). The vehicle control device 10 of the embodiment is provided with the engine 2, the hydraulic pressure controller 6, the ECU 7, the starter 13, and the transmission 14.

The ECU 7 controls respective portions of the vehicle 1 based on the information of various sensors in the vehicle 1. The ECU 7 determines an injection amount, an injection timing, and ignition timing, etc. of fuel based on a driving state of the engine 2 such as the engine rotating speed, an inlet air amount, and a throttle opening degree, etc. and controls an injector and an ignition plug, etc. Further, since the ECU 7 has a gear shift map and determines a gear shift ratio of the automatic transmission mechanism 4 based on the throttle opening degree, and a vehicle speed, etc. and controls the hydraulic pressure controller 6 to establish the determined gear shift ratio.

To improve fuel economy, the vehicle 1 of the embodiment is provided with a function for stopping the engine 2 while the vehicle 1 stops or travels, that is, with a so-called idling stop control. The ECU 7 is configured to be able to carry out the idling stop control based on the information of the various sensors when a predetermined condition has been satisfied, the predetermined condition being, for example, a condition that an accelerator is totally closed with an accelerator opening degree set to 0, and a condition that the opening degree is equal to or less than a predetermined opening degree, etc. The idling stop control in the embodiment includes at least one of a free-run control, a deceleration eco-run control or a stop eco-run control.

The deceleration eco-run control is a control for causing the vehicle 1 to travel while releasing the clutch 3 and stopping the engine 2. In the deceleration eco-run control, the fuel economy can be improved by causing the engine 2 to stop consuming fuel. In the deceleration eco-run control, an idling stop is carried out by stopping the operation of the engine 2 at the time of deceleration travel of the vehicle 1 that is carried out mainly in association with a brake operation (brake press operation) of a driver.

Likewise the deceleration eco-run control, the free-run control is a control for causing the vehicle 1 to travel while releasing the clutch 3 and stopping the engine 2. In the free-run control, the idling stop is carried out by positively stopping the operation of the engine 2 not only when the vehicle 1 travels at decreasing speed in association with the brake operation of the driver (brake press operation) and the vehicle 1 stops but also when the vehicle 1 travels at constant speed, etc.

The stop eco-run control is a control for stopping the engine 2 and releasing the clutch 3 when the vehicle 1 stops at a red light or travels while got caught in a traffic congestion.

Further, when a predetermined condition such as that an accelerator is pressed while the idling stop control is carried out, etc., the ECU 7 engages the clutch 3 and recovers the vehicle 1 from the idling stop control to an ordinary drive control. With the operation, acceleration can be carried out by the power of the engine 2.

Further, when the engine 2 has been restarted after the recovery of the vehicle 1 from the idling stop control, the ECU 7 carries out a hydraulic pressure supply control by the accumulator 9. Specifically, when the line pressure PL of the hydraulic pressure circuit 12 has become equal to or higher than a predetermined hydraulic pressure after the start of the starter 13 for restarting the engine, the ECU 7 opens the electromagnetic on-off valve 11 and supplies the hydraulic pressure accumulated in the accumulator 9 to the respective portions of the transmission 14. Note that, as the predetermined hydraulic pressure, it is possible to set the value of the line pressure PL in such a state that the engine 2 begins to be rotated to some extent by the starter 13 after the period in which a large amount of a current has been consumed at the beginning of start of the starter 13.

Figure 2:
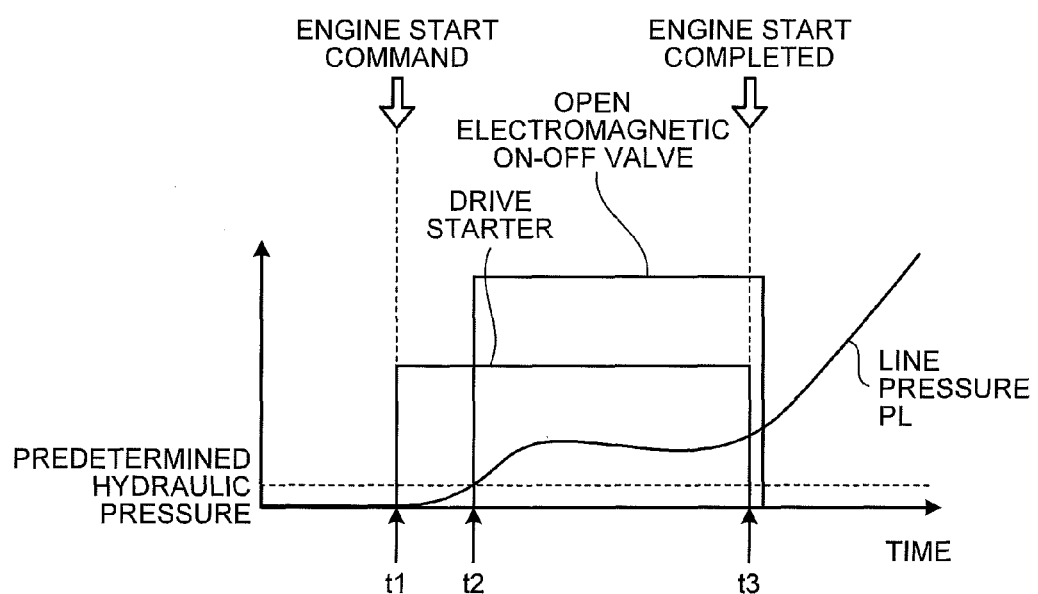
FIG. 2 is a time chart illustrating a hydraulic pressure control process carried out by the vehicle control device of the embodiment at the time of recovery from an idling stop control.
Figure 3:
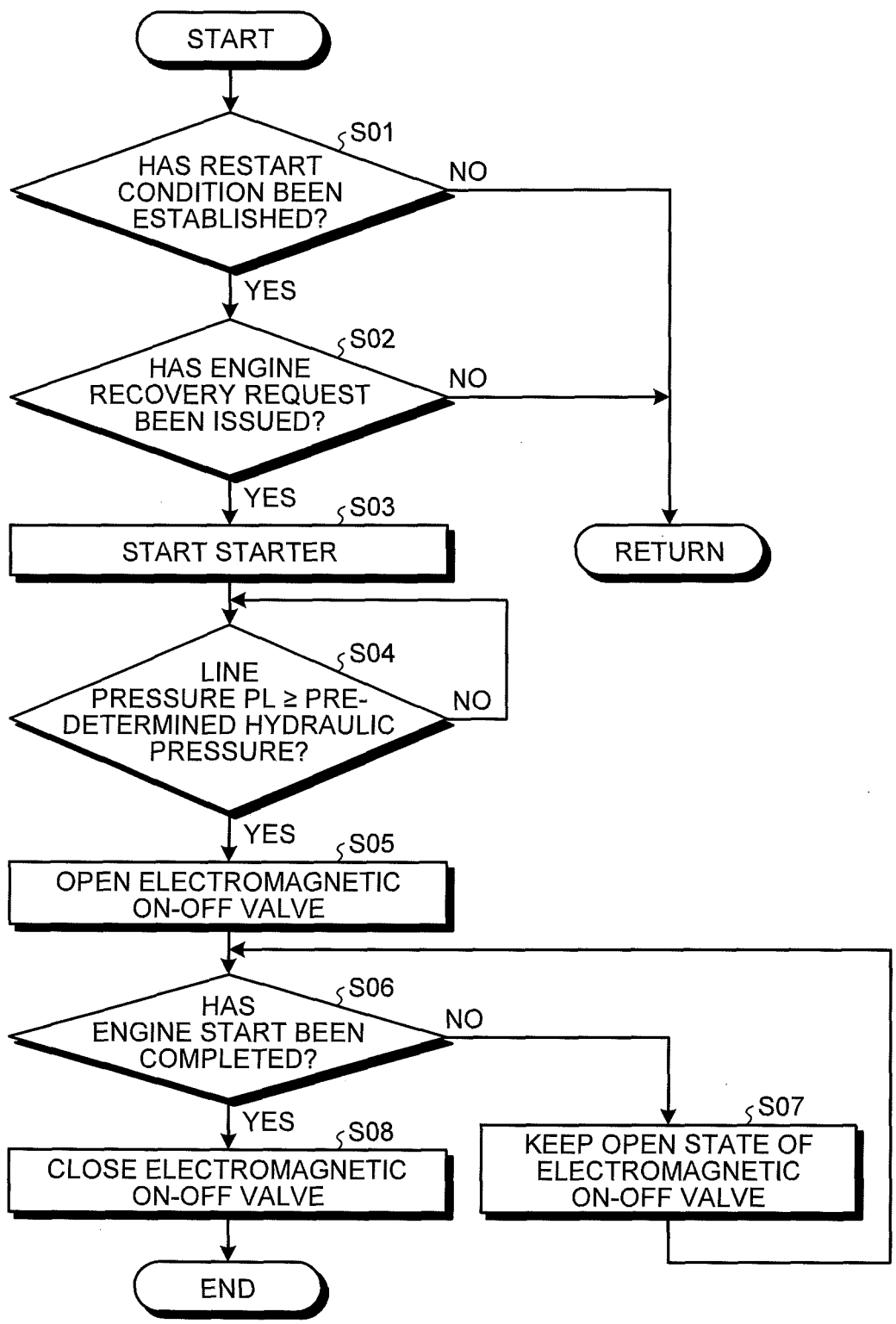
FIG. 3 is a flowchart of the hydraulic pressure control process carried out by the vehicle control device of the embodiment at the time of recovery from the idling stop control.

Next, an operation of the vehicle control device 10 according to the embodiment will be explained referring to FIGS. 2 and 3. FIG. 2 is a time chart illustrating a hydraulic pressure control process carried out by the vehicle control device of the embodiment at the time of recovery from the idling stop control, and FIG. 3 is a flowchart of the hydraulic pressure control process.

First, an operation relation between the electromagnetic on-off valve 11 of the accumulator 9 and the starter 13 at the time of restart of the engine will be explained referring to FIG. 2.

The time chart of FIG. 2 illustrates a time transition of the line pressure PL of the hydraulic pressure circuit 12, and further the time chart illustrates a drive period of the starter 13 and an open period of the electromagnetic on-off valve 11 in an overlapping fashion. The horizontal axis of FIG. 2 illustrates a time, and the vertical axis thereof illustrates the line pressure PL, a drive state of the starter, and a state of the electromagnetic on-off valve 11. In FIG. 2, the driving state of the starter is illustrated as a graph in which the drive state is shown, when the starter stops, as 0 and which rises stepwise when the stator is driven, and the state of the electromagnetic on-off valve 11 is illustrated as a graph in which the state is shown, when the electromagnetic on-off valve 11 is closed, as 0 and which rises stepwise when the electromagnetic on-off valve 11 is opened.

The time chart of FIG. 2 illustrates a state that the engine 2 is restarted after the idling stop control has been carried out and the engine 2 has stopped, and at the beginning of the time chart, the engine 2 and the oil pump 8 are stopped and no oil is supplied to the line pressure PL. The accumulator 9 has completely accumulated the hydraulic pressure while the vehicle travels ordinarily.

At time t1, the restart condition of the engine 2 has been established, and an engine start command is transmitted from the ECU 7 to the starter 13, and the starter 13 begins to be driven in response to the engine start command.

When a restart control of the engine 2 begins at time t1 and the starter 13 begins to be driven, the engine 2 begins to rotate after time t1 and the oil pump 8 also begins to be driven accordingly. With the operations, the line pressure PL is generated and gradually increased.

When the line pressure PL has become equal to or higher than the predetermined hydraulic pressure at time t2, the electromagnetic on-off valve 11 is opened (valve opening), the hydraulic pressure accumulated in the accumulator 9 is supplied to the hydraulic pressure circuit 12, and the line pressure PL is increased.

When the engine 2 has been completely started at time t3, the drive of the starter 13 is stopped and subsequently the electromagnetic on-off valve 11 is also closed. Thereafter, the line pressure PL is supplied by the oil pump 8.

Next, the hydraulic pressure control process at the time of restart of the engine will be explained referring to FIG. 3. The process illustrated in the flowchart of FIG. 3 is carried out by the ECU 7 when the idling stop control is carried out. Further, as a premise of the process of FIG. 3, it is assumed that a hydraulic pressure accumulation process of the accumulator 9 has been carried out and the electromagnetic on-off valve 11 has been closed (valve closing).

First, whether or not the restart condition of the engine 2 has been established is confirmed (S01). The restart condition can include a condition that can determine that a driver has an intention for carrying out acceleration, for example, a condition that the driver presses an accelerator pedal during the idling stop control, etc. When the restart condition has been established (S01: Yes), the process goes to step S02. When the restart condition has not been established (S01: No), the process returns to step S01.

Next, whether or not an engine recovery request has been issued is confirmed (step S02). The engine recovery request is a command for recovering from an idling stop travel to an engine travel, and the engine recovery request is detected using such changes of state that a brake is turned off, the negative pressure of the brake is lowered, and a battery voltage is lowered, etc. as a trigger. When the engine recovery request is issued (step S02: Yes), the process goes to step S03. When the engine recovery request is not issued (S02: No), the process returns to step S01.

When the engine recovery request is issued at step S02, the restart control of the engine 2 is begun. First, the engine start command is transmitted to the starter 13, and the starter 13 is started (S03). In the time chart of FIG. 2, the conditions at steps S01 and 02 are established at time t1, the restart control of the engine 2 is begun, and the starter 13 is started.

Next, whether or not the line pressure PL of the hydraulic pressure circuit 12 has become equal to or higher than a predetermined hydraulic pressure is confirmed (S04). When the line pressure PL has been lower than the predetermined hydraulic pressure (S04: No), it is waited that the line pressure PL has become equal to or higher than the predetermined hydraulic pressure in a state that the electromagnetic on-off valve 11 is closed.

In contrast, when the line pressure PL has been equal to or higher than the predetermined hydraulic pressure (S04: Yes), the electromagnetic on-off valve 11 is opened (valve opening) (S05), the oil, which has been accumulated in the accumulator 9, is supplied to the hydraulic pressure circuit 12 and the line pressure PL is increased, and the pressure-increased oil is supplied to the respective portions of the transmission 14 including the clutch 3 and the automatic transmission mechanism 4. In the time chart of FIG. 2, the line pressure PL is lower than the predetermined hydraulic pressure in the period from time t1 to t2 and reaches the predetermined hydraulic pressure at time t2, and the electromagnetic on-off valve 11 is opened.

Next, whether or not the engine start has been completed is confirmed (S06). When the engine start has not been completed, (S06: No), the process returns to step S06 while keeping the open state of the electromagnetic on-off valve 11 (S07). In contrast, when the engine start has been completed (S06: Yes), the electromagnetic on-off valve 11 is closed (S08), thereby the oil supplied from the oil pump 8 is prevented from flowing into the accumulator 9 and the process is finished.

Next, an effect of the vehicle control device 10 according to the embodiment will be explained.

The vehicle control device 10 of the embodiment includes the engine 2, the starter 13 for starting the engine 2, the transmission 14 for transmitting the power of the engine 2 to the driving wheel 5, the oil pump 8 for supplying the hydraulic pressure to the transmission 14 according to the power of the engine 2, the accumulator 9 for accumulating the hydraulic pressure ejected from the oil pump 8, and the electromagnetic on-off valve 11 for controlling the hydraulic pressure accumulated in the accumulator 9. When the engine 2 is restarted after the engine 2 has been stopped by carrying out the idling stop control, the ECU 7 of the vehicle control device 10 opens the electromagnetic on-off valve 11 when the line pressure PL has become equal to or higher than the predetermined hydraulic pressure after the start of the starter 13 and supplies the hydraulic pressure accumulated in the accumulator 9 to the respective portions of the transmission 14.

When the engine is restarted, since the largest current is required at the moment the starter 13 is started, the voltage of the ECU 7 at the time is most lowered. Thereafter, when the starter 13 begins to rotate to some extent, the voltage is restored. When it is intended to open the electromagnetic on-off valve 11 in a period in which the voltage drop due to the start of the starter 13 has not been recovered, since a sufficient current cannot be supplied to the electromagnetic on-off valve 11, responsiveness of the electromagnetic on-off valve 11 is deteriorated and a valve opening operation is delayed. As a result, there is a possibility that the supply of the hydraulic pressure accumulated in the accumulator 9 is delayed and the hydraulic pressure supply control to the transmission 14 such as the clutch 3 and the automatic transmission mechanism 4, etc. becomes unstable.

In contrast, in the vehicle control device 10 of the embodiment, with the configuration described above, the electromagnetic on-off valve 11 is opened when the line pressure PL has become equal to or higher than the predetermined hydraulic pressure after the start of the starter 13. In the state that the line pressure PL has been equal to or higher than the predetermined hydraulic pressure, it can be regarded that the engine 2 and the oil pump 8 begin to be driven sufficiently, the starter 13 need not be supplied with a large current, and the voltage drop due to the start of the starter 13 is sufficiently recovered. Since the influence of voltage drop due to the starter 13 can be avoided, the electromagnetic on-off valve 11 can be stably controlled so that the hydraulic pressure supply control can be stably carried out by the accumulator 9.

Further, the embodiment is configured such that the recovery from the voltage drop due to the starter 13 is determined based on the line pressure PL which reflects to which extent the engine 2 is rotated instead of based on the time passed after the starter 13 has started. With the configuration, when the engine 2 operates earlier, the electromagnetic on-off valve 11 can be opened earlier accordingly so that the hydraulic pressure supply control can be carried out promptly by the accumulator 9. In this way, the vehicle control device 10 of the embodiment can carry out the hydraulic pressure supply control stably and promptly by the accumulator 9 after the engine has started.

Although the embodiment of the present invention has been explained, the embodiment is presented as an example and it is not intended to restrict the scope of the present invention by the embodiment. The embodiment can be embodied in various other modes and allows various omissions, replacements and modifications within the scope which does not depart from the gist of the present invention. The embodiment and the modifications of the embodiment are contained in the scope and the gist of the present invention as well as contained in the present invention described in the claim and in the scope of the equivalent of the present invention.

The embodiment exemplifies the configuration in which the line pressure PL of the hydraulic pressure circuit 12 is applied as information for determining whether or not the electromagnetic on-off valve 11 has been opened. Although the information is related to the hydraulic pressure generated according to the drive of the oil pump 8, any hydraulic pressure other than the line pressure PL can be applied as long as the hydraulic pressure can confirm the change of hydraulic pressure due to the rotation of the starter 13, and, for example, the hydraulic pressure Pc supplied to the clutch 3, the hydraulic pressure Pd supplied to the automatic transmission mechanism 4, etc. can also be applied.

Further, although the embodiment exemplifies the configuration in which the accumulator 9 is connected to the position where the line pressure PL of the hydraulic pressure circuit 12 is increased, a configuration, in which the accumulator 9 is connected to other position of the hydraulic pressure circuit 12, may be employed. For example, a configuration, in which the accumulator 9 is connected after the hydraulic pressure circuit 12 has been branched to the clutch 3 side and only the hydraulic pressure Pc supplied to the clutch 3 is increased, may be employed.

REFERENCE SIGNS LIST

1 VEHICLE
2 ENGINE
7 ECU
8 OIL PUMP
9 ACCUMULATOR
10 VEHICLE CONTROL DEVICE
11 ELECTROMAGNETIC ON-OFF VALVE
13 STARTER
14 TRANSMISSION (POWER TRANSMISSION DEVICE)

The invention claimed is:

1. A vehicle control device comprising:
an engine;
a starter configured to start the engine;
a power transmission device configured to transmit power of the engine to a driving wheel;
an oil pump configured to supply hydraulic pressure to the power transmission device according to the power of the engine;
an accumulator configured to accumulate the hydraulic pressure ejected from the oil pump; and
an electromagnetic on-off valve configured to control the hydraulic pressure accumulated in the accumulator, wherein
the accumulator is connected to a hydraulic pressure circuit through the electromagnetic on-off valve,
the oil pump is connected to the hydraulic pressure circuit without passing through the electromagnetic on-off valve,
each of the hydraulic pressure accumulated in the accumulator and the hydraulic pressure generated by the oil pump is supplied to the power transmission device through the hydraulic pressure circuit,
the vehicle control device executes a restart control when the engine is restarted after the engine has stopped, the restart control including:
starting a drive of the starter; and
when hydraulic pressure generated according to a drive of the oil pump has become equal to or higher than a predetermined hydraulic pressure while the starter is driven, opening the electromagnetic on-off valve to supply the hydraulic pressure accumulated in the accumulator to the power transmission device.

* * * * *